United States Patent
Halliwell et al.

[11] Patent Number: 6,116,612
[45] Date of Patent: Sep. 12, 2000

[54] FLUID SEAL

[75] Inventors: Mark A Halliwell; Richard A B McCall, both of Derby, United Kingdom

[73] Assignee: Rolls-Royce plc, London, United Kingdom

[21] Appl. No.: 09/134,947
[22] Filed: Aug. 17, 1998

[30] Foreign Application Priority Data

Aug. 23, 1997 [GB] United Kingdom ............... 9717857

[51] Int. Cl.[7] .................................................. F01D 11/08
[52] U.S. Cl. ........................... 277/412; 277/415; 277/421
[58] Field of Search .................................. 277/412, 413, 277/114, 415, 421, 422

[56] References Cited

U.S. PATENT DOCUMENTS

| | | | |
|---|---|---|---|
| 2,686,657 | 8/1954 | Kalintinsky | 277/413 |
| 3,606,349 | 9/1971 | Petrie et al. | 277/415 |
| 3,971,563 | 7/1976 | Sugimura | 277/413 |
| 4,606,652 | 8/1986 | Swearingen | 277/412 |
| 4,641,842 | 2/1987 | Katakoa | 277/422 |
| 5,314,304 | 5/1994 | Wiebe | 277/414 |

FOREIGN PATENT DOCUMENTS

| | | |
|---|---|---|
| 1008526 | 10/1965 | United Kingdom . |
| 1277212 | 6/1972 | United Kingdom . |
| 2198489 | 6/1988 | United Kingdom . |
| 2242710 | 10/1991 | United Kingdom . |

*Primary Examiner*—Anthony Knight
*Assistant Examiner*—Enoch Peavey
*Attorney, Agent, or Firm*—W. Warren Taltavull; Farkas & Manelli PLLC

[57] ABSTRACT

An annular seal is provided between a turbine rotor disc and the adjacent static structure. The seal comprises rotor fins extending from the turbine disc for rotation therewith and an abradable honeycomb layer radially outward of the rotor fins. The abradable honeycomb layer is located on the inner diameter of a sealing ring attached to the static structure. The sealing ring is moveable in an axial direction so that in operation the honeycomb has one axial position for transient conditions and an alternative axial position for stabilized running. The seal clearance can thus be optimised at the two axial positions reducing the leakage flow through the seal.

15 Claims, 2 Drawing Sheets

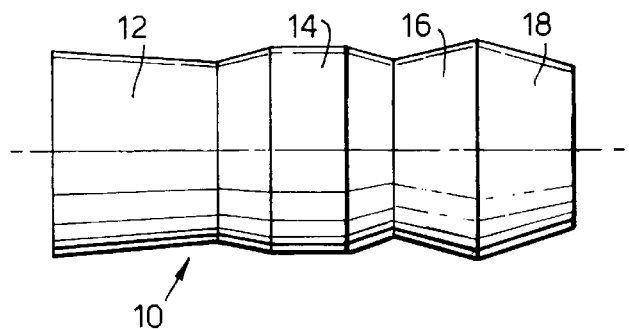
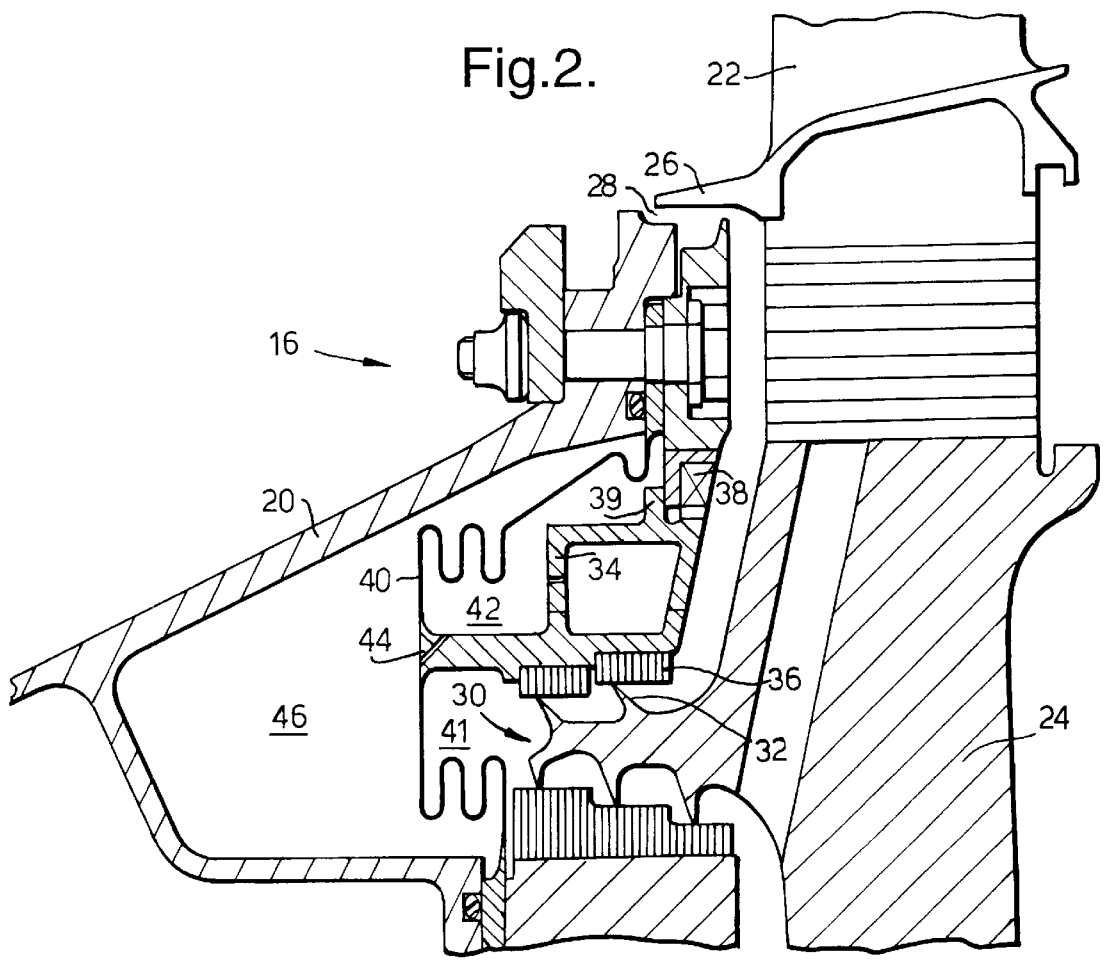

FLUID SEAL

FIELD OF THE INVENTION

The present invention relates to a fluid seal and in a particular to a fluid seal between components capable of relative rotational movement.

BACKGROUND OF THE INVENTION

In the turbine section of a gas turbine engine turbine discs rotate next to fixed stator structure. In order to prevent turbine gases leaking from the gas turbine annulus inwards onto the disc faces a seal structure is arranged between the rotor and stator.

The seal structure is provided with a radial clearance which provides a tortuous path for the turbine gases. To reduce the gas leakage through the seal the clearance of the seal is set to a minimum during stabilised engine running. However during transient conditions, such as an engine acceleration, differential radial growth occurs between the rotor and stator and the seal clearance is reduced. Radial incursions cause seal rub and abrasion which increases the seal clearance. The increased seal clearance allows leakage through the seal when the engine returns to the stabilised running condition.

SUMMARY OF THE INVENTION

The present invention seeks to provide an improved seal structure in which the clearance is optimised during transient and stabilised engine running to reduce leakage through the seal.

According to the present invention a fluid seal between two components capable of relative rotational movement comprises a first seal member mounted on one of the components and a second seal member mounted on the other component, a seal clearance is provided between the first and second seal members which provides a tortuous flow path for a fluid which in operation passes between the two components, means being provided to move the first seal member relative to the second seal member so that in operation the first seal member is moved in response to the rotational speed of the components, the first seal members being profiled to give the required seal clearances at different rotational speeds.

Said first seal member is preferably formed from abradable material so as to be abraded by contact between said first and second seal members whereby said first seal member is so abraded at different positions as to define said profile giving the required seal clearances at different rotational speeds.

Preferably the means for moving the first seal member relative to the second seal member are pneumatic.

In the preferred embodiment of the present invention the means for moving the first seal member comprises a sealing ring slidably mounted on one of the components and connected to the first seal member, the sealing ring defines a cavity which is selectively pressurised to move the sealing ring and the first seal member. The cavity may be pressurised by a flow of fluid which in operation passes through the components. Pressurisation of the cavity may be controlled by orifices in the cavity or by valves. The valves are preferably operated in response to the control parameters of the rotating components.

Preferably the sealing ring is attached to resilient means which operate to return the sealing ring automatically to its original position. In one embodiment of the present invention the resilient means is a diaphragm. In a second embodiment of the present invention the resilient means is a spring which acts on the sealing ring and is preloaded to return the sealing ring to its original position.

In the preferred embodiments of the present invention one of the components rotates relative to the other component which is stationary and the first seal member is moveable between two positions.

BRIEF DESCRIPTION OF THE DRAWINGS

The present invention will now be described with reference to the accompanying drawings in which:

BRIEF DESCRIPTION OF DRAWINGS

Figure 3:
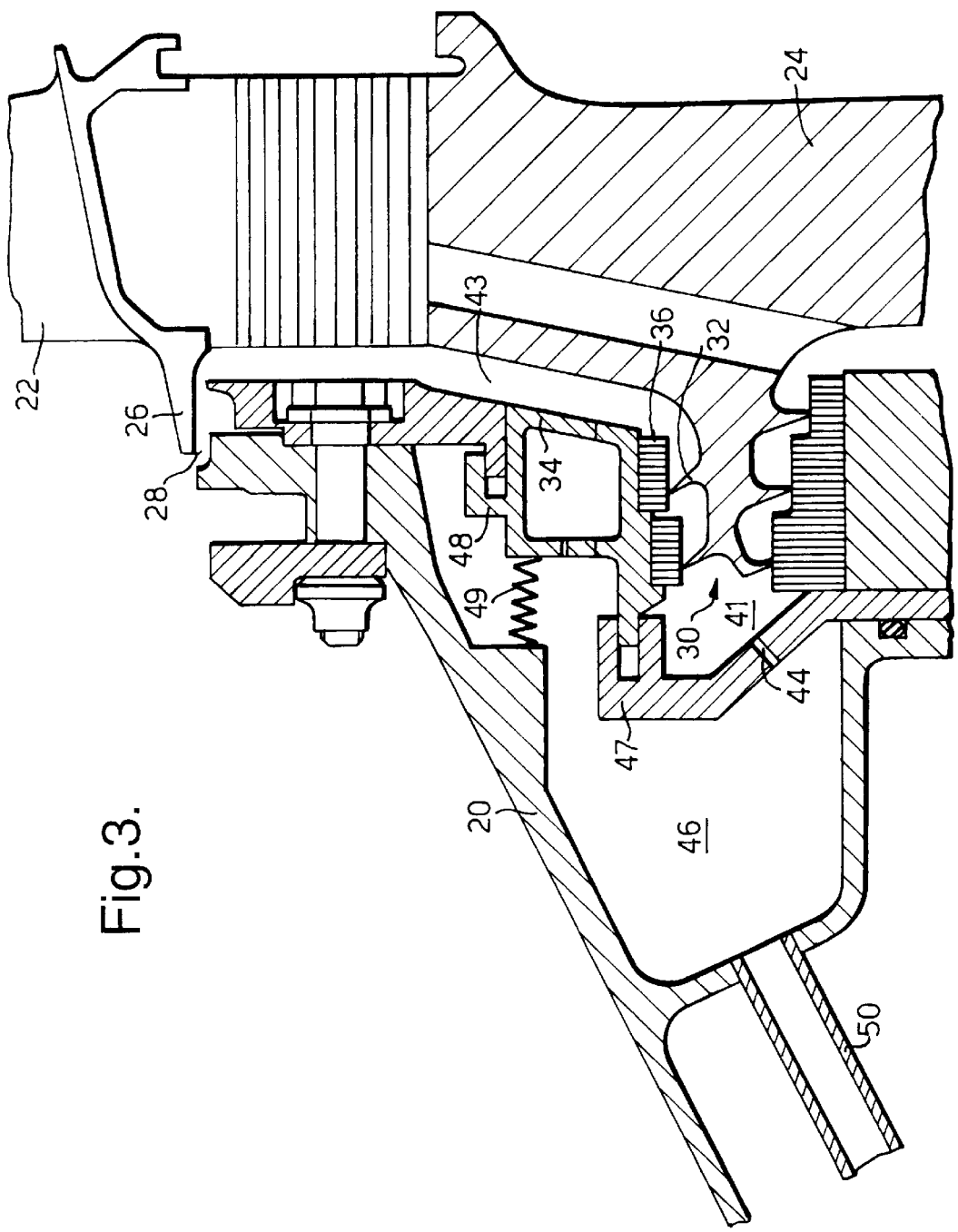

FIG. 1 is a diagrammatic sketch of a gas turbine engine.

FIG. 2 is a part sectional view of a turbine rotor seal in accordance with one embodiment of the present invention.

FIG. 3 is a part sectional view of a turbine rotor seal in accordance with a second embodiment of the present invention.

DETAILED DESCRIPTION OF THE INVENTION

In FIG. 1 a gas turbine engine generally indicated at 10 comprises a compressor 12, combustion equipment 14, a turbine section 16 and an exhaust nozzle 18 all in flow series.

Referring to FIG. 2 the turbine section 16 includes static structure 20 and at least one stage of rotary turbine blades 22 mounted on a turbine disc 24.

The platforms 26 of the turbine blades 22 form the inner wall of an annular gas flow duct. Excessive leakage of the hot gases through gap 28 between the platforms 26 and the static structure 20 reduces the efficiency of the turbine section 16.

To prevent excessive leakage of the hot gases across the face of the turbine disc 24 an annular seal 30 is provided radially inward of the platforms 26 and static structure 20. The annular seal 30 provides a tortuous flow path for the hot turbine gases. The annular seal 30 comprises rotor fins 32 and an abradable honeycomb layer 36. The rotor fins 32 extend from the turbine disc 24 and rotate therewith. A sealing ring 34 is located radially outward of the rotor fins 32 and the abradable honeycomb 36 is located on its inner diameter.

Cross-keys 38 locate the sealing ring 34 to the static structure 20. The cross-keys 38 allow differential, axial or radial movements between the sealing ring 34 and the static structure 20 whilst maintaining relative concentricity. A flexible annular diaphragm 40 seals the sealing ring 34 to the static structure 20. The diaphragm preloads the sealing ring 34 in a rearward direction against axial stops 39.

Holes 44 are provided in the diaphragm 40 and connect the air flow in regions 41 and 42 to the air in the enclosed region 46 between the diaphragm 40 and the static structure 20.

On engine acceleration the cavities 41 and 42 are pressurised. The pressurisation of the cavity 46 lags behind in time due to the small controlled flow through the holes 44. Therefore during the transient acceleration the sealing ring 34 moves axially forward. Axial movement of the sealing ring 34 is allowed by the flexibility of the diaphragm 40.

Differential radial growth between the rotor disc 24 and static structure 20 occurs during an engine transient and causes the tips of the rotor fins 32 to abrade the honeycomb 36. The radial incursion of the tips of the rotor fins 32 causes a cut in the abradable honeycomb 36 at a particular axial location.

When engine conditions are stabilised the cavity 46 in front of the sealing ring 34 is fully pressurised and the sealing ring 34 is restored to its original axial position. The tips of the rotor fins 32 now run at a different axial position to that where the radial incursion occurred during an engine transient. The rotor fins 32 run inboard of uncut honeycomb 36 at stabilised conditions. The clearance at the tips of the rotor fins 32 is thus maintained at a minimum during stabilised conditions.

During a transient deceleration the axial stops 39 prevent excessive movement of the sealing ring 34 in the opposite direction. It will however be appreciated by one skilled in the art that the stops 39 could be omitted so that on deceleration any radial incursion of the tips of the rotor fins 32 on the honeycomb 36 will occur at a different axial position.

FIG. 3 shows a further embodiment of the present invention in which the same reference numerals have been used for integers common to both embodiments. The sealing ring 34 is located by birdmouths 47 and 48 to the static structure 20. The birdmouths 47 and 48 allow axial movement of the sealing ring 34 relative to the static structure 20. An annular spring 49 located between the sealing ring 34 and the static structure 20 preloads the sealing ring 34 in a rearward direction.

Pipes 50 lead away from the cavity 46 in front of the sealing ring 34 to an area of potentially lower pressure, such as to the bypass duct (not shown). The pressure in the cavity 46 is controlled by valves (not shown) in the pipes 50.

On engine acceleration the relative growth of the static structure 20 and the turbine discs 24 is measured or implied from engine parameters. The valves in the pipes 50 are opened in response to the radial growth to reduce the pressure in the cavity 46. The cavities 41 and 43 are pressurised and the sealing ring 34 moves forwards to a new axial position. During an engine transient any radial incursion of the tips of the rotor fins 32 causes the honeycomb 36 at this axial position to be cut.

As stabilised conditions are reached the valves are closed off and small leakage flows allow the cavity 46 to come to pressure. This restores the sealing ring 34 to its axially rearward position. The tips of the rotor fins 32 then run inboard of uncut honeycomb 36 at a different axial position to that where a radial incursion occurred during an engine transient. By running adjacent uncut honeycomb 36 the rotor fin tip clearance is reduced and hence the leakages.

It will be appreciated by one skilled in the art that the valve positions could be fully variable as could the axial position of the sealing ring 34.

Although the invention has been described with the seal clearance being set by abrasion of the honeycomb 36 it will be further appreciated that the honeycomb 36 could be profiled to give the required seal clearance at the different axial positions.

A seal in accordance with the present invention offers the advantage that by selecting one axial position for transient conditions and an alternative axial position for stabilised running the seal clearances can be optimised at each axial position reducing the leakages.

We claim:

1. A fluid seal between two components of a gas turbine engine having an axis and capable of relative rotational movement comprising a first seal member mounted on one of the components and a second seal member mounted on the other component, a seal clearance being provided between the first and second seal members which provides a tortuous flow path for a fluid which in operation passes between the two components, said components exhibiting relative movement in a radial direction upon operation of said gas turbine engine, means being provided to move the first seal member relative to the second seal member so that in operation the first seal member is moved in response to the rotational speed of the components in an axial direction as well as in a radial direction, the first seal member being profiled to give the required seal clearance at different rotational speeds.

2. A fluid seal as claimed in claim 1 wherein said first seal member is formed from abradable material so as to be abraded by contact between said first and second seal members whereby said first seal member is so abraded at different positions as to define said profile giving the required said clearances at different rotational speeds.

3. A fluid seal as claimed in claim 1 in which the means for moving the first seal member relative to the second seal member are pneumatic.

4. A fluid seal as claimed in claim 3 in which the means for moving the first seal member comprises a sealing ring slidably mounted on one of the components, the sealing ring is connected to the first seal member and defines a cavity which is selectively pressurised to move the sealing ring and the first seal member.

5. A fluid seal as claimed in claim 4 in which the cavity is pressurised by a flow of fluid which in operation passes through the components.

6. A fluid seal as claimed in claim 5 in which the pressurization of the cavity is controlled by orifices.

7. A fluid seal as claimed in claim 5 in which the pressurization of the cavity is controlled by valves.

8. A fluid seal as claimed in claim 4 in which the pressurisation of the cavity is controlled by orifices.

9. A fluid seal as claimed in claim 4 in which the pressurisation of the cavity is controlled by valves.

10. A fluid seal as claimed in claim 9 in which the valves are operated in response to the control parameters of the rotating components.

11. A fluid seal as claimed in claim 1 in which the first seal member is attached to resilient means which operate to return the sealing ring automatically to its original position.

12. A fluid seal as claimed in claim 11 in which the resilient means is a diaphragm.

13. A fluid seal as claimed in claim 11 in which the resilient means is a spring which acts on the sealing ring and is preloaded to return the sealing ring to its original position.

14. A fluid seal as claimed in claim 1 in which the first seal member moves between a first and second position relative to the second seal member.

15. A fluid seal as claimed in claim 1 in which one of the components rotates relative to the other component which is stationary.

* * * * *